Aug. 31, 1965     L. E. ELLSWORTH, SR     3,203,486
STONE PICKER APPARATUS

Filed Feb. 18, 1963     3 Sheets-Sheet 1

Fig. 1

Inventor,
Lewis E. Ellsworth, Sr.
By Edw. A. Hampton
Attorney.

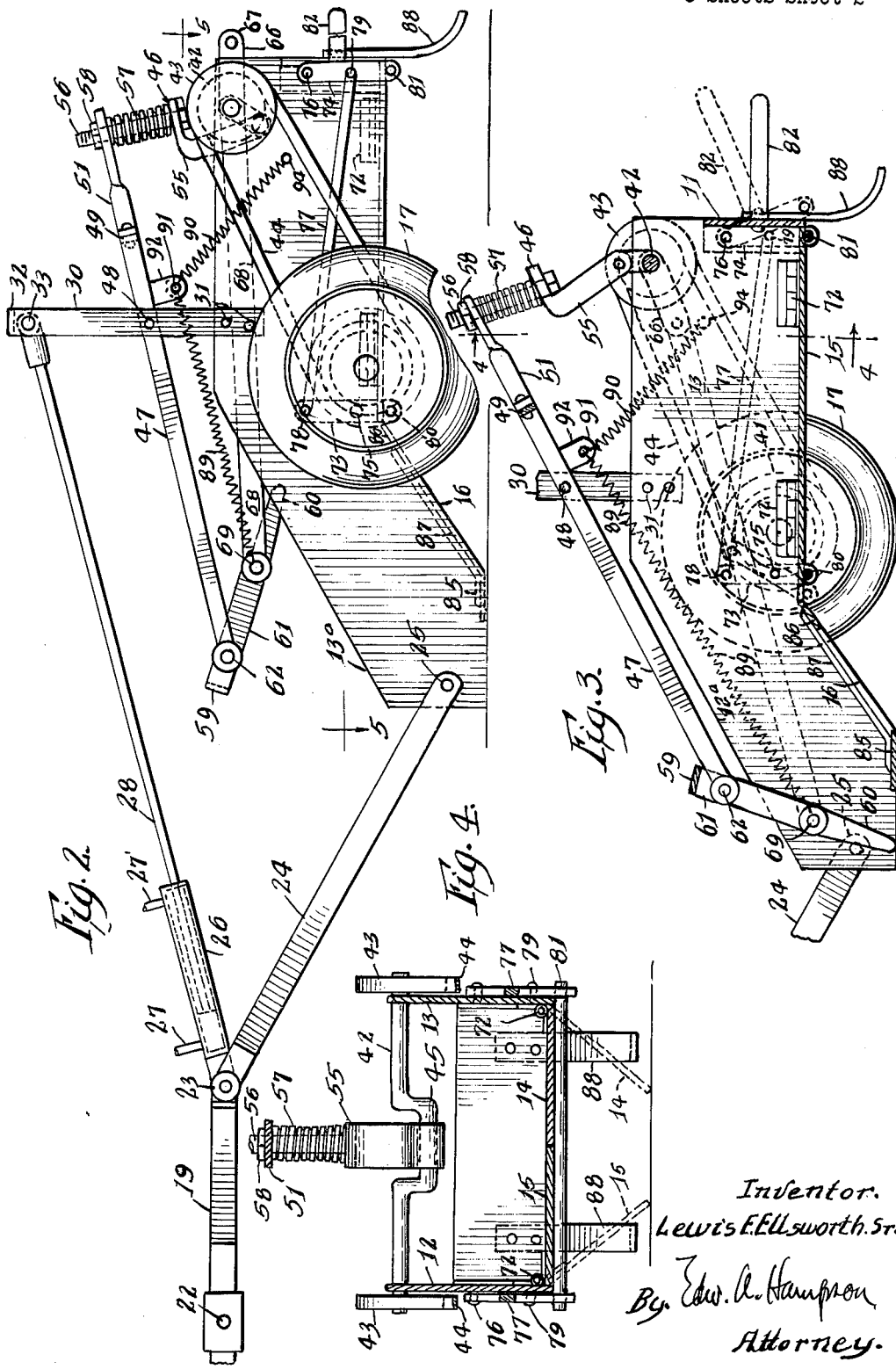

Aug. 31, 1965     L. E. ELLSWORTH, SR     3,203,486
STONE PICKER APPARATUS
Filed Feb. 18, 1963     3 Sheets-Sheet 3
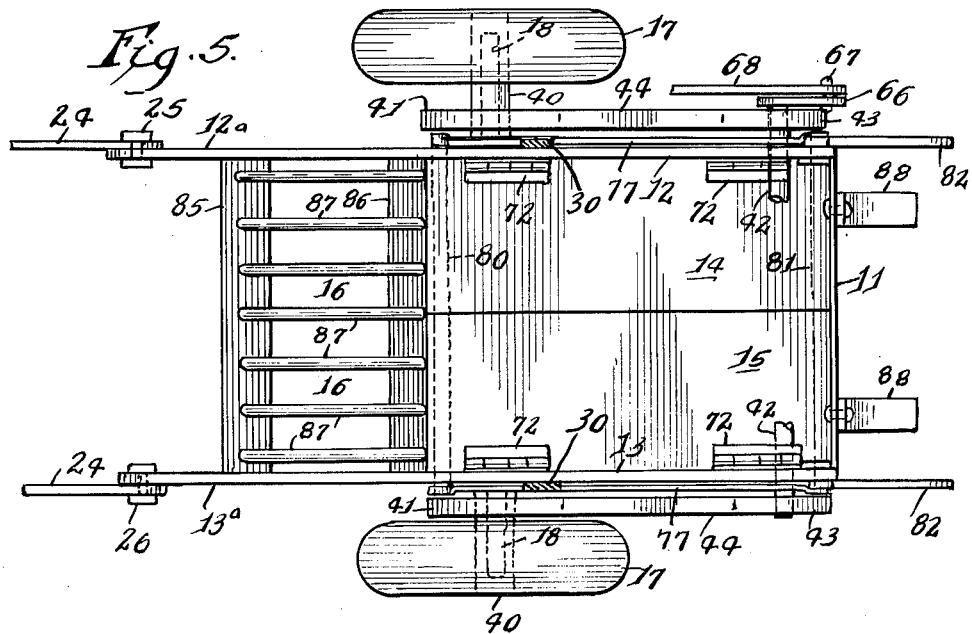
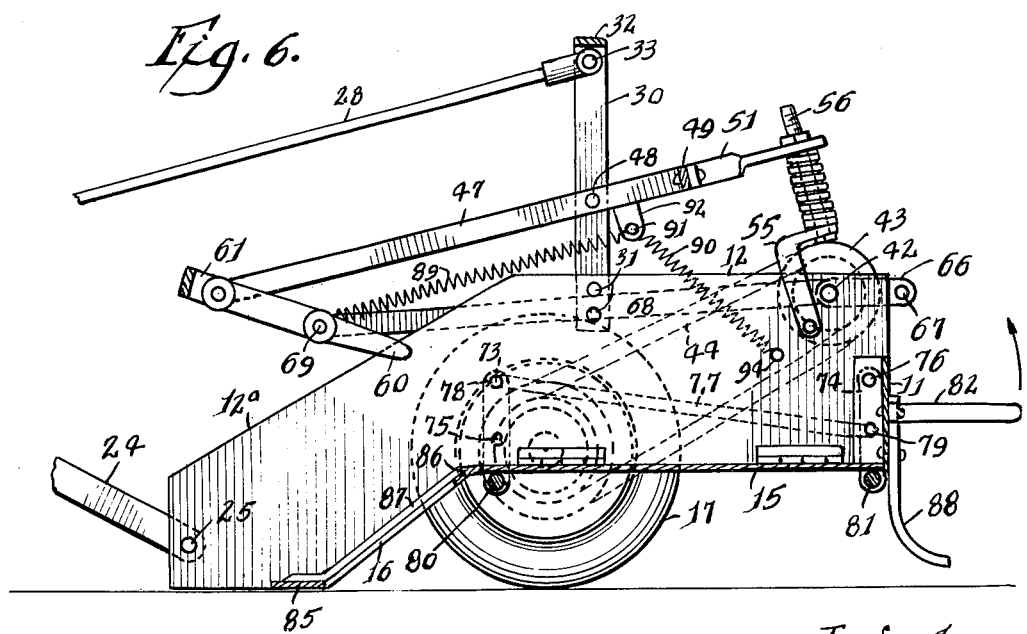
Inventor,
Lewis E. Ellsworth Sr.
By Edw. A. Hampson
Attorney.

United States Patent Office 3,203,486
Patented Aug. 31, 1965

3,203,486
STONE PICKER APPARATUS
Lewis E. Ellsworth, Sr., R.D. 4, Tunkhannock, Pa.
Filed Feb. 18, 1963, Ser. No. 259,244
5 Claims. (Cl. 171—63)

The invention hereof is with respect to a new and improved apparatus comprising a stone picker, that is, a device for picking and removing stones from a field or the like. This is not to be confused with heavy machinery for land clearing. It is a special purpose machine, specifically designed and constructed for picking or gathering and removing relatively small stones of, say, up to six inches or thereabouts in maximum dimension, such as are common to many farm fields.

Basically, the apparatus is of simple construction. It comprises a wheeled container having a downwardly sloping front lip and a rocking fork mounted above the lip. The fork rocks to contact stones lying just ahead of the lip and to then push and flip these stones up the lip and into the container.

The principal object of the invention hereof is that of providing a field stone picker of simple and rugged construction.

A further object is that of providing such a device which will pick and gather farm field stonse which has but one active working part, the rocking fork, which both picks the stones and delivers them to the wheeled container.

Other and further objects of the invention hereof will become apparent on reading the following description of the apparatus taken in conjunction with the accompanying drawings.

In the drawings:

FIGURE 1 is a top plan view;

FIGURE 2 is a side elevation;

FIGURE 3 is a section taken on line 3—3 of FIGURE 1, some details omitted for clarity of illustration;

FIGURE 4 is a section taken on line 4—4 of FIGURE 3, parts omitted;

FIGURE 5 is a sectional view taken on line 5—5 of FIGURE 2, parts omitted; and

FIGURE 6 is a section similar to FIGURE 3 but showing the picker mechanism in a different position.

It is to be noted that in several figures of the drawings that in the interest of clear illustration of construction, some detail, as noted, are omitted.

The general construction of the apparatus is comprised of a box or body, generaly referred to by numeral 10 and formed by rear wall 11, side walls 12 and 13, and the bottom of which is comprised by doors 14 and 15. Instead of a front wall, the box or body is provided with a forwardly directed and downwardly directed lip portion 16 on which stones which are picked up are received and directed into the body portion of the apparatus.

The body is suitably on wheels 17 which may be mounted to stub shafts 18 suitably secured to the body 10.

Suitable hitch is provided, comprising draw bar 19 which connects to spreader 20. Braces 21 are preferably provided to steady the spreader 20 and a hitch connection is provided, including pin 22 for connecting to the draw bar of a tractor.

At each end of spreader 20 there is pivotally mounted, by pivot pin 23, reach rods 24 which at their other ends are pivoted by pivots 25—25 to forwardly projecting portions 12a and 13a of side walls 12 and 13 of body 10.

Hydraulic cylinder 26, mounted centrally of spreader 20, has suitable connections at 27–27' for hydraulic fluid and includes piston rod 28.

A yoke, generally referred to by numeral 29, is comprised of upright members 30, secured at their lower ends to side walls 12 and 13, by rivets 31 or suitable equivalent. Cross bar 32 suitably connects and spaces the upper ends of upright members 30. Centrally of cross bar 30 there is provided a pivoted connection 33 to which the outer end of the piston rod 28 of hydraulic cylinder 26 connects.

The operative part of the apparatus consists of a stone picker fork and the mechanisms operative thereof.

Wheels 17 provided with hubs 40 are mounted on stub shafts 18.

The operative part of the apparatus is driven from the wheels and for this purpose there are provided belt pulleys 41 mounted on hubs 40.

Crank shaft 42 which is mounted to the side walls 12 and 13, at the rear thereof and near the top, in suitable bearings or journals not shown, has mounted thereto pulleys 43.

Belts 44 mounted to pulleys 41 and 43 drive the crank shaft 42 as the apparatus moves forward.

Crank shaft 42 is provided with a crank portion 45 to which is mounted connecting rod 46 comprised of several parts, as will be described.

Fork oscillating levers 47 are pivoted to yoke uprights 30 at 48. It is to be noted that the fork oscillating levers 47 are the legs of a U frame, the base of which is identified by numeral 49. Centrally of base members 49 at 50 there is attached lever extension 51.

Lever extension 51 connects to connecting rod 46. Connecting rod 46 is composed of a part 55 journaled on crank 45 which part 55 carries a threaded portion 56 and on which spring 57 is mounted. The outer end of lever extension 51 slips down over threaded member 56 to rest on top of spring 57 and nut 58 is threaded down against lever extension 51 so that it is adjustably secured. It will be seen that this mounting of the lever extension 51 to connecting rod 46 provides for adjustment of the degree of oscillation of the far ends of the fork oscillating levers 47, and also provides for some give or cushioning should fork 59 strike an obstruction.

Stone picker fork 59 is basically a rectangular member with cut-outs, or originally formed to provide fingers 60 and having rearward extensions 61 pivotally mounted at 62 to the forward ends of fork oscillating levers 47.

From the foregoing it will be seen that as the apparatus is moved forwardly, that through pulleys 41 and 43 and belts 44, crank shaft 42 will be rotated. Rotation of crank shaft 42 through connecting rod 46 oscillates fork oscillating levers 47 on their pivots 48 and thus fork 59 is oscillated.

The far end of crank shaft 42 is provided with a second crank 66 which conveniently is a separate strap member secured at the end of shaft 42. This crank 66 is provided with a crank pin 67 to which is mounted a reach rod 68. Reach rod 68 extends forwardly and at its forward end is mounted to pivot 69 on fork 59.

From the immediately foregoing, it will be seen that crank 66 will cause reciprocation of reach rod 68, which in turn will oscillate fork 59 on its pivots 62. Thus compound oscillation is imparted to fork 59. One is what may be termed a vertical oscillation imparted from oscillating levers 47, whereas the other may be termed a horizontal oscillation imparted through reciprocation of reach rod 68.

As previously referred to, the bottom of body 10 is comprised of doors 14 and 15 which may be suitably hinged to the side walls 12 and 13 by hinges 72.

Some device should be provided to retain the doors 14 and 15 in closed position, and for this purpose a simple support bar construction is provided. Levers 73 and 74 are pivoted at 75 and 76 on the outer sides of body side walls 12 and 13. Link bars 77 are pivoted at their ends to levers 73 and 74. The forward ends of the link bars 77 are pivoted to levers 73 at 78 and their rearward ends to lever 74 at 79.

Lock bars or rods connected to the lower ends of the levers extend across the width of body 10. Bar 80 extending across between levers 73 and bar 81 between levers 74. Lock operating lever 82 is rigidly connected to link 74. The operation is indicated in dotted lines. As lever 82 is moved upwardly, the lower ends of levers 73 and 74 move relatively outwardly carrying lock bars 80 and 81 out from under doors 14 and 15, allowing the doors to open and discharge the contents of the box 10.

It is deemed that in the foregoing all the essential features of the apparatus have been described. However, attention is directed to various details as follows:

Forward body lip portion 16 may be a solid sheet but obviously and preferably, to allow dirt to sift out, it is comprised of separate strips 85 and 86 to which are suitably secured spaced bars 87.

At the rear of body 10 suitable feet 88 are suitably mounted whereby, when the apparatus is disconnected from the tractor, it will be prevented from tipping backward.

Preferably, fingers 60 of fork 59 will be provided as separate members, suitably secured, whereby should a finger be broken it may be easily replaced.

While the drive has been shown as by pulleys and belts, it is, of course, evident that equivalents may be substituted, as sprockets and chains or bevel gearing and shaft.

If hydraulic power is not available, instead of providing hydraulic cylinder 26 there may be provided suitable manual adjustment in lieu thereof.

To smooth out the operation of the oscillating fork mechanism, springs 89 and 90 may be provided. Both springs at one end attach to pins 91 of ears 92 suitably attached to fork oscillating levers 47, and at their other ends attached respectively to pins 93 and 94.

Depending on conditions, it may be desired that travel of fork 59 be varied. If desired that the vertical travel of the fork be increased, the nut 58 is backed off some, or conversely if vertical travel of fork 59 is to be decreased, then nut 58 is tightened down.

Crank 45 relative crank 66 is about 120° ahead in clockwise direction. As shown in FIGURE 2, this relation brings fork 59 to its lowermost position with fork fingers 60 substantially in outermost position. Then as the fork raises, the fingers 60 move inwardly to reach highest velocity as the stones picked up approach the top of inclined lip 16 so as to flip them into box 10.

It is intended that the foregoing disclosure extend to and include all obvious and equivalent constructions such as have been to some extent referred to in the foregoing.

The construction and operation of the apparatus have been fully disclosed and described in the foregoing.

I claim:

1. In a stone picker apparatus, the combination comprising, a forwardly and downwardly inclined lip member and a stone picker fork member operatively related thereover, the fork member pivotally suspended, a vertically oscillating lever, a pivot carried thereby and to which the fork is pivotally suspended, a pivot on the fork member spaced from the first said pivotal connection and a horizontally oscillating reach rod mounted to the pivot on the fork member and whereby a compound oscillation is imparted to the stone picker fork member.

2. In a stone picker apparatus, in combination, walls comprising a box body, a wall thereof comprising a lip portion forwardly and downwardly inclined, wheels mounting the box body, a pivot supported from a wall of the box body, an oscillating lever mounted intermediate its ends to the pivot, a stone picker fork member pivotally mounted at one end of the oscillating lever and positioned over the lip portion, a connecting rod, the oscillating lever at its other end mounted to the connecting rod, a crank shaft to which the connecting rod is mounted, means oscillating the stone picker fork member on its pivotal mounting and power transmitting means driven from the wheels mounting the box body and driving the crank shaft.

3. Apparatus for picking and collecting stones and comprising in combination walls forming a box body, a wall thereof downwardly and forwardly inclined as a lip portion, wheels mounting the box body, the downwardly and forwardly inclined lip portion comprised of spaced substantially parallel strip portions and spaced bar like members secured at their respective opposite ends to the strip portions, a stone picker fork comprised in part of spaced picker fingers mounted substantially over the lip portion and means traversing the free outer ends of the picker fingers through a generally elliptical path a portion whereof is approximately in the plane of the lip portion.

4. In a stone picker apparatus, the combination comprising, walls forming a box body, a wall thereof comprising a lip portion downwardly and forwardly inclined, wheels mounting the box body, a pivot supported from a wall of the box body, an oscillating lever mounted intermediate its ends to the pivot, a connecting rod, the connecting rod comprising in part a threaded rod-like portion, a coiled spring mounted thereon, the oscillating lever at an end mounted to the threaded rod-like portion and a nut on the threaded rod-like portion and resiliently securing the oscillating lever at an end thereof between the coiled spring and nut.

5. In a stone picker apparatus, the combination of walls comprising a box body, a wall thereof comprising a downwardly and forwardly inclined lip, a stone picker fork comprising spaced substantially parallel finger members having free outer end portions and suspended substantially over the lip portion, means oscillating the fork in a vertical plane and means concomitantly oscillating the free outer end portions of the finger members through a curved path in a horizontal plane.

References Cited by the Examiner

UNITED STATES PATENTS

| 1,932,771 | 10/33 | Davidson | 56—362 |
| 2,599,993 | 6/52 | Hill et al. | 280—405 |
| 2,732,673 | 1/56 | Henne | 171—63 |

ANTONIO F. GUIDA, Primary Examiner.